US011970013B2

(12) United States Patent
Yato et al.

(10) Patent No.: US 11,970,013 B2
(45) Date of Patent: Apr. 30, 2024

(54) RECORDING DEVICE

(71) Applicant: SEIKO EPSON CORPORATION, Tokyo (JP)

(72) Inventors: Keiichi Yato, Matsumoto (JP); Yosuke Nakano, Matsumoto (JP); Atsuhiko Takeuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/142,380

(22) Filed: Jan. 6, 2021

(65) Prior Publication Data

US 2021/0213762 A1 Jul. 15, 2021

(30) Foreign Application Priority Data

Jan. 9, 2020 (JP) ................................ 2020-002007

(51) Int. Cl.
*B41J 29/02* (2006.01)
*G03G 21/16* (2006.01)

(52) U.S. Cl.
CPC .......... *B41J 29/02* (2013.01); *G03G 21/1619* (2013.01)

(58) Field of Classification Search
CPC ... B41J 29/02; B41J 15/18; B41J 29/06; B41J 29/13; G03G 21/1619; G03G 15/6517
See application file for complete search history.

(56) References Cited

U.S. PATENT DOCUMENTS

2007/0171269 A1* 7/2007 Murase .................... B41J 29/08 347/108
2009/0152435 A1* 6/2009 Kondo ..................... G05G 1/60 248/677
2014/0182986 A1* 7/2014 Nakajima ............. F16F 9/3484 188/313

FOREIGN PATENT DOCUMENTS

DE 4123868 A * 1/1992 .............. B41J 15/04
JP S62-194291 5/1986
JP 2002070945 A * 3/2002
JP 2003-140416 5/2003
JP 2007-196487 8/2007
JP 2009-192579 8/2009
JP 2014237307 A * 12/2014 ............. A01B 1/026

OTHER PUBLICATIONS

Yoshida, Masanori; Perfect Printer, May 28, 2002, Japan, All Pages (Year: 2002).*
Chen, Hua; A New Universal Shock Absorbing Caster Wheel, Apr. 1, 2015, China, All Pages (Year: 2015).*

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

A recording device includes a main body including a recording unit configured to perform recording on a medium pulled out from a roll body including the medium wound around a core member, and a leg part configured to support the main body from an installation surface on which the main body is installed. The leg part includes contact parts configured to make contact with the installation surface at respective positions different from each other. The contact parts include three reference contact parts located on a same plane and one movable contact part. The movable contact part is coupled with the main body through an elastic member that is elastically deformable in a direction that intersects the plane.

10 Claims, 13 Drawing Sheets

RECORDING DEVICE

The present application is based on, and claims priority from JP Application Serial Number 2020-002007, filed Jan. 9, 2020, the disclosure of which is hereby incorporated by reference herein in its entirety.

BACKGROUND

1. Technical Field

The present invention relates to a recording device such as an ink-jet printer, for example.

2. Related Art

In the related art, recording devices that discharge liquid such as ink to a surface of a medium such as a sheet to perform recording of an image and the like on the surface of the medium is known. In such recording devices, the higher the flatness of the support base that supports the medium at the portion where the liquid is discharged, the higher the quality of the image to be obtained.

Incidentally, the installation surface on which the recording device is installed rarely completely horizontal and has irregularities. When distortion is caused in the recording device due to such irregularities of the installation surface, distortion is caused also in the support base, and consequently the image quality is reduced. JP-A-2007-196487 discloses a recording device that reduces the influence of irregularities of the installation surface on the main body with a configuration in which a deformation absorption member composed of a spring member is interposed between a main body that performs recording on the medium and a leg part that supports the main body from the installation surface.

In the recording device disclosed in JP-A-2007-196487, however, the deformation absorption member is interposed between the main body and each of two support column parts of the leg part, and therefore, when the two deformation absorption members elastically deform in directions different from each other, significant distortion is caused especially at the joining part between the main body and the leg part. As a result, the main body is largely affected by irregularities of the installation surface, and significant distortion is caused in the main body.

SUMMARY

A recording device that solves the above-described problems includes a main body including a recording unit configured to perform recording on a medium pulled out from a roll body including the medium wound around a core member, and a leg part configured to support the main body from an installation surface on which the main body is installed. The leg part includes contact parts configured to make contact with the installation surface at respective positions different from each other. The contact parts include three reference contact parts located on a same plane and one movable contact part. The movable contact part is coupled with the main body through an elastic member that is elastically deformable in a direction that intersects the plane.

DESCRIPTION OF EXEMPLARY EMBODIMENTS

An embodiment of a recording device is described below with reference to the accompanying drawings.

The recording device rotatably holds a roll body of a medium wound around a core member, and discharges liquid to the surface of the medium pulled out from the roll body to record an image and the like on the medium. The recording device is a large-format ink-jet printer that discharges ink as an example of liquid to perform printing on a medium such as a sheet, for example. A large-format printer is a printer capable of performing printing on a medium with a short side width of A3 (297 mm) or larger.

Figure 1:
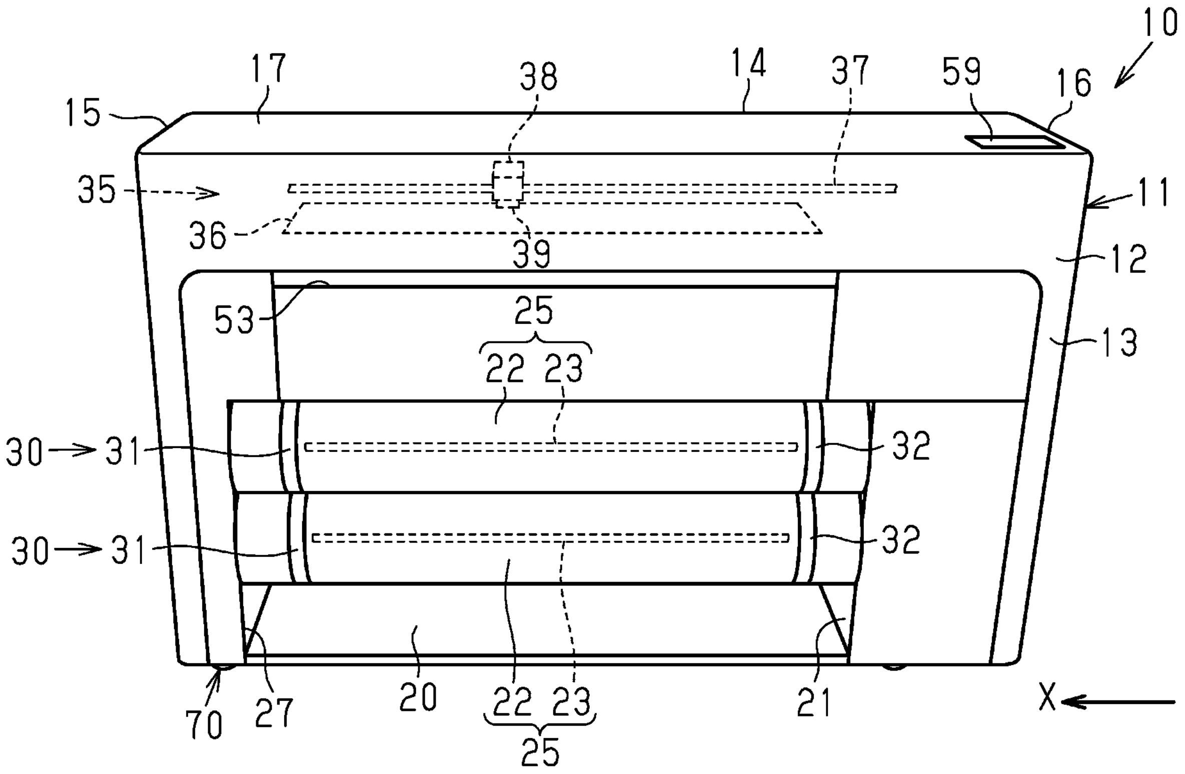
FIG. 1 is a front perspective view illustrating a schematic configuration of an embodiment of a recording device.
Figure 2:
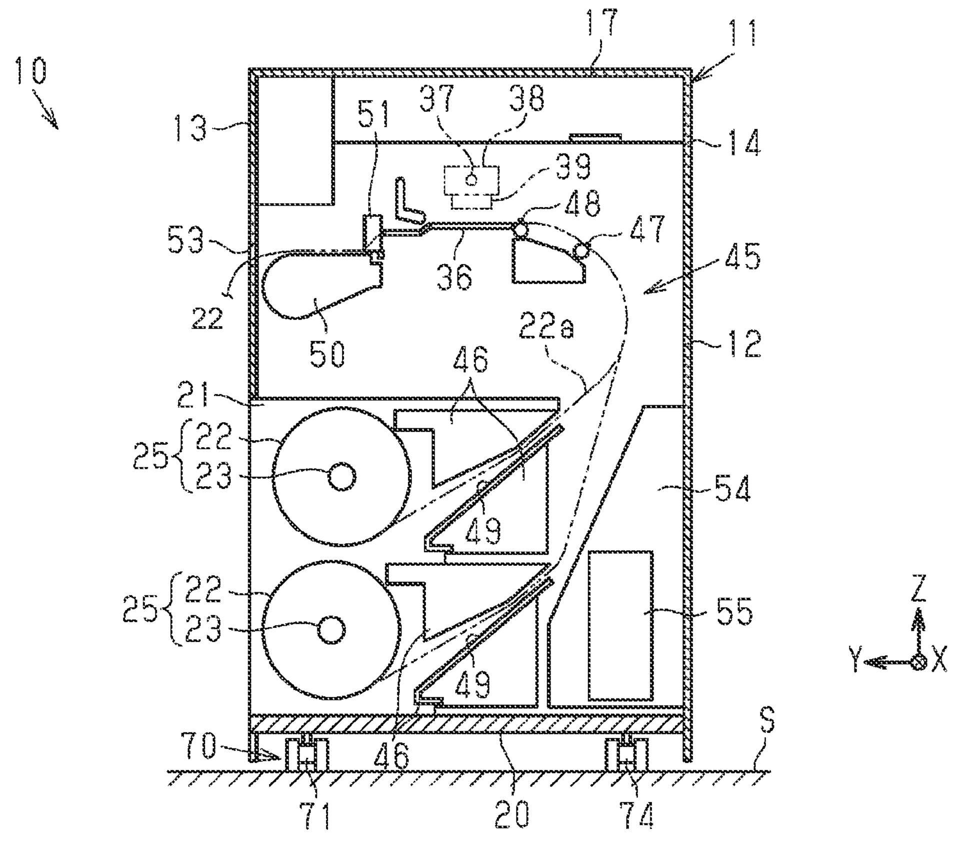
FIG. 2 is a sectional view schematically illustrating a part of an inner structure in a housing.

As illustrated in FIGS. 1 and 2, a recording device 10 includes a main body 11, and a leg part 70 that supports the main body 11 from an installation surface S where the main body 11 is installed. The main body 11 includes a housing 12 having a substantially cuboid shape. The housing 12 includes a front wall 13, a rear wall 14, a first side wall 15, a second side wall 16, and a top wall 17. The housing 12 is coupled with a base frame 20 supported by the leg part 70.

Hereinafter, the direction in which the base frame 20 and the top wall 17 face each other in the recording device 10 is referred to as a height direction of the recording device 10. In addition, a direction in which the first side wall 15 and the second side wall 16 face each other along a plane orthogonal to the height direction is referred to as a width direction of the recording device 10. Further, a direction in which the front wall 13 and the rear wall 14 face each other along a direction along a plane orthogonal to the height direction is referred to as a front-rear direction of the recording device 10.

The height direction, the width direction, and the front-rear direction are orthogonal to each other. Accordingly, when the recording device 10 is disposed such that the width direction and the front-rear direction are set along the horizontal plane, the height direction is parallel to the gravity direction. Note that, in FIGS. 1 to 13, X, Y and Z indicate the width direction, the front-rear direction, and the height direction, respectively, of the recording device 10.

As illustrated in FIGS. 1 and 2, the main body 11 includes a housing part 21. The housing part 21 houses a cylindrical roll body 25 in which a medium 22, on which the main body 11 performs recording, is wound around a core member 23. The housing part 21 includes an opening 27 at a position on the base frame 20 side in the front wall 13 of the housing 12, and extends from the front wall 13 toward the rear wall 14. In this embodiment, the housing part 21 is configured to be able to house a pair of the roll bodies 25 aligned in the height direction Z of the recording device 10.

Figure 3:
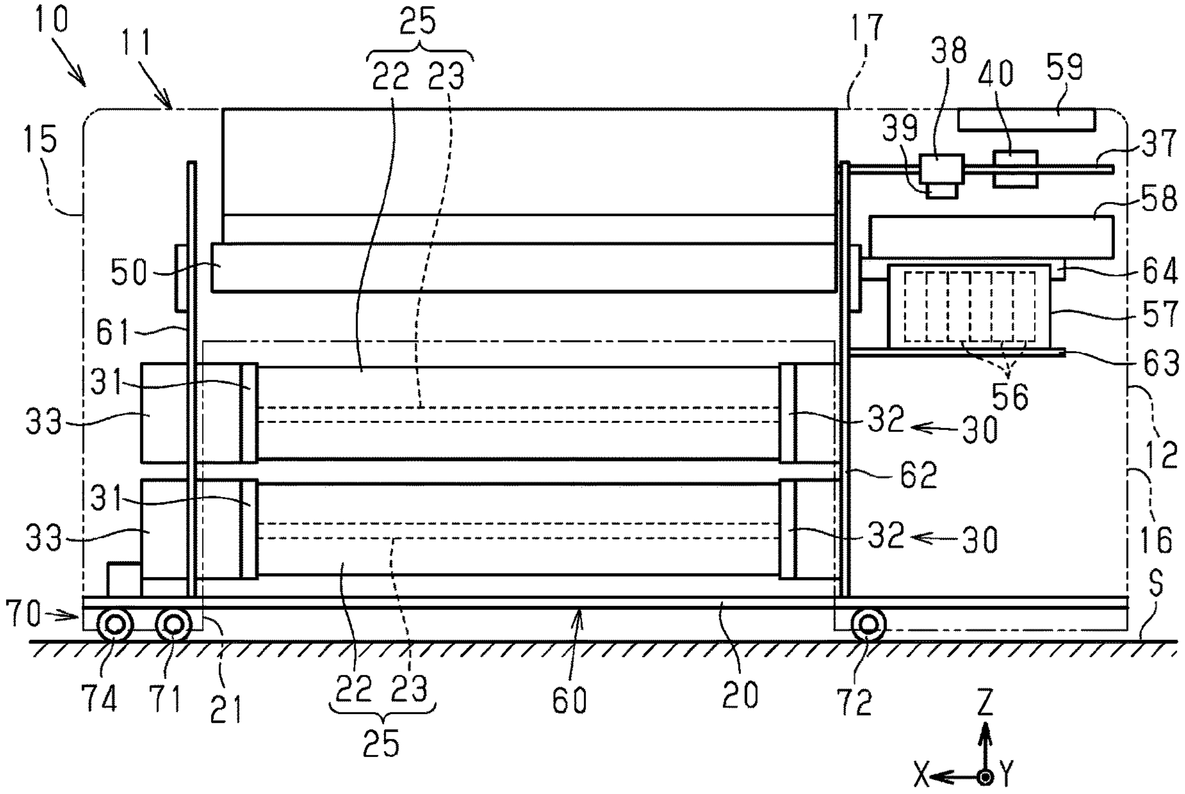
FIG. 3 is a front view schematically illustrating a part of the inner structure in the housing.

As illustrated in FIGS. 1 to 3, a pair of holding parts 30 rotatably mounted to the main body 11 is attached for each of the paired roll bodies 25 housed in the housing part 21. The holding part 30 includes a first holding part 31 that holds one end of the roll body 25, and a second holding part 32 that holds the other end of the roll body 25. The first holding part 31 and the second holding part 32 are removable from the main body 11 through the opening 27.

When mounted in the main body 11, the first holding part 31 and the second holding part 32 are aligned in the width direction X of the recording device 10 in the housing part 21. When the roll body 25 is placed in the housing part 21 in the state where the first holding part 31 is attached to one end of the roll body 25 and the second holding part 32 is attached to the other end of the roll body 25, the posture of the pair of the roll bodies 25 is stabilized with the first holding part 31 and the second holding part 32 aligned in the width direction X.

The first holding part 31 is mounted rotatably around an axis line extending in the width direction X with respect to a first side frame 61 illustrated in FIG. 3. The second holding part 32 is mounted rotatably around an axis line extending in the width direction X with respect to a second side frame 62 illustrated in FIG. 3. With the first holding part 31 and the second holding part 32 holding the roll body 25, the holding part 30 holds the roll body 25 such that the roll body 25 is rotatable around a central axis of the core member 23.

The roll body 25 held by the first holding part 31 and the second holding part 32 is driven into rotation by a driving part 33 illustrated in FIG. 3. The driving part 33 is located on the first side wall 15 side relative to the first holding part 31. Through normal rotational driving of a drive motor (not illustrated), the driving part 33 rotates the first holding part 31 and the second holding part 32 in a direction for feeding the medium 22 wound around the roll body 25 toward the rear wall 14 side in the housing 12.

As illustrated in FIGS. 1 to 3, the main body 11 includes a recording unit 35 in the housing 12. The recording unit 35 includes a support base 36, a guide shaft 37, a carriage 38, and a recording head 39.

The support base 36 is located on the top wall 17 side relative to the housing part 21. The support base 36 is a member having a rectangular plate shape extending in the width direction X in the housing 12. The medium 22 unwound from the roll body 25 is transported in the housing 12 to the support base 36, and then transported on the support base 36 from the rear wall 14 side toward the front wall 13 side.

The guide shaft 37 is located on the top wall 17 side relative to the support base 36. The guide shaft 37 is a member having a rod shape extending in the width direction X. The guide shaft 37 movably supports the carriage 38 along the guide shaft 37. The carriage 38 is configured to be able to reciprocate along the guide shaft 37 when a carriage motor 40 illustrated in FIG. 3 is driven.

The recording head 39 is mounted on the carriage 38. The recording head 39 is disposed at an end portion on the support base 36 side in the carriage 38 so as to face the support base 36. The recording head 39 discharges liquid to the medium 22 on the support base 36 to perform recording on the medium 22.

As illustrated in FIG. 2, the main body 11 includes a transport unit 45 in the housing 12. In conjunction with the holding part 30, the transport unit 45 transports the medium 22 unwound from the roll body 25. The transport unit 45 includes a transport path formation part 46, an intermediate roller 47, and a transport roller 48. The transport path formation part 46 is provided for each of the paired roll bodies 25.

The transport path formation part 46 is located on the rear wall 14 side relative to each of the paired roll bodies 25 housed in the housing part 21. The transport path formation part 46 forms a transport path 49 that guides the medium 22*a* fed from the roll body 25 to the rear wall 14 side of the housing 12 through rotational driving of the holding part 30.

The intermediate roller 47 and the transport roller 48 transport the medium 22*a* passed through the transport path 49. The intermediate roller 47 and the transport roller 48 are composed of a driving roller and a driven roller, which are a pair of rollers supported rotatably around axis lines extending in the width direction X axis. The intermediate roller 47 and the transport roller 48 sandwich and support the medium 22*a* with the driving roller and the driven roller from both the front side and the back side.

The transport unit 45 drives the intermediate roller 47 and the transport roller 48 into rotation through normal rotational driving of a drive motor (not illustrated) to transport the medium 22*a* to the support base 36 through the transport path 49 and transport the medium 22*a* on the support base 36 from the rear wall 14 side to the front wall 13 side. While FIG. 2 illustrates a state where the medium 22*a* is fed from both of the paired roll bodies 25, the medium 22*a* is fed from only one of the paired roll bodies 25 in the actual recording.

As illustrated in FIG. 2, the main body 11 includes, in the housing 12, a sheet ejection port member 50 and a cutting part 51. The sheet ejection port member 50, which is located on the front wall 13 side with respect to the support base 36, supports the medium 22 passed through the support base 36 and guides the medium 22 to a sheet ejection port 53 formed in the front wall 13. The cutting part 51 cuts the recorded medium 22. The medium 22 cut by the cutting part 51 is ejected from the sheet ejection port 53.

Figure 4:
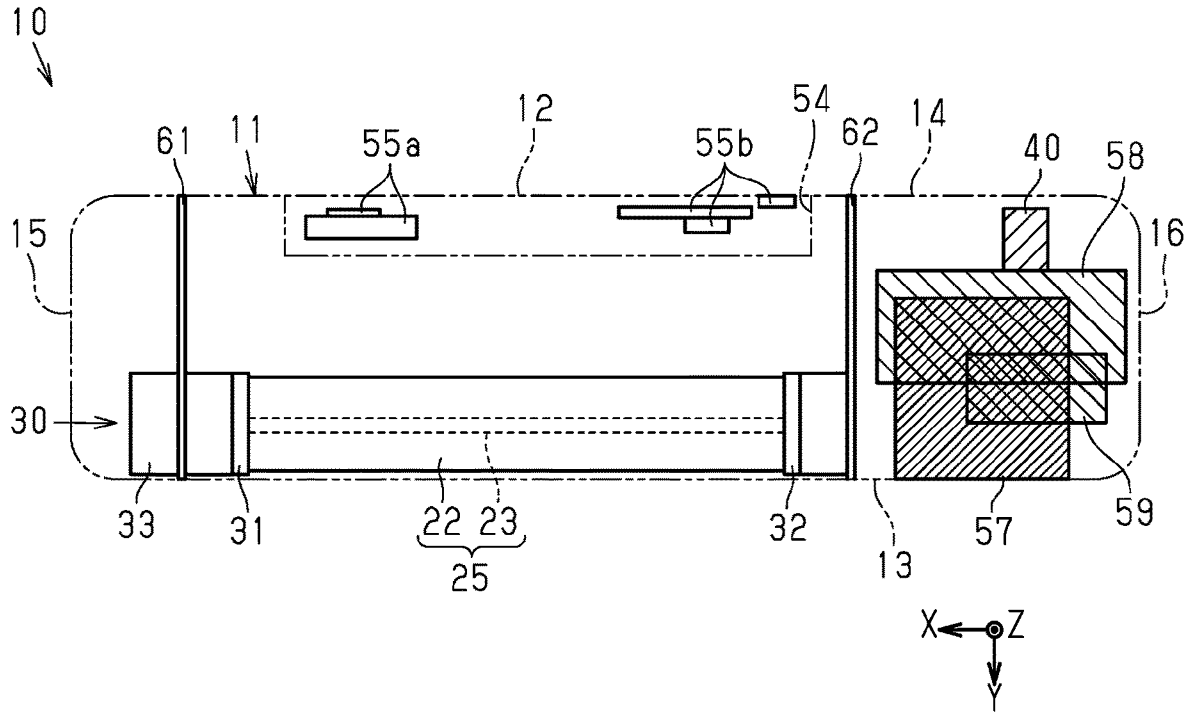
FIG. 4 is a view schematically illustrating a part of a structure in the housing in plan view as viewed from a height direction.

As illustrated in FIGS. 2 and 4, the main body 11 includes a board storage chamber 54 in the housing 12. The board storage chamber 54 is a space located at a corner portion between the rear wall 14 and the base frame 20. The board storage chamber 54 houses various boards 55. The board storage chamber 54 is provided between the first side frame 61 and the second side frame 62. The board storage chamber 54 houses two power source boards 55*a* that supply power to the recording device 10, and three control boards 55*b* that control various control objects such as the transport unit 45 and the recording unit 35, for example.

The power source boards 55*a* are disposed on the first side frame 61 side in the region between the first side frame 61 and the second side frame 62. The control boards 55*b* are disposed on the second side frame 62 side in the region between the first side frame 61 and the second side frame 62.

As illustrated in FIGS. 3 and 4, the main body 11 includes a mounting part 57 for mounting a cartridge 56 in which liquid to be supplied to the recording head 39 is housed. The mounting part 57 is located at a position on the second side wall 16 side relative to the first holding part 31 and the second holding part 32 and on the top wall 17 side relative to the first holding part 31 and the second holding part 32.

When mounted in the mounting part 57, the cartridge 56 is connected to the recording head 39 through a flexible tube (not illustrated). Then, when the pressure of the liquid in the recording head 39 decreases as the liquid is discharged, the liquid is supplied from the cartridge 56 to the recording head 39 through the tube (not illustrated).

The main body 11 includes a maintenance unit 58 that performs maintenance of the recording head 39. The maintenance unit 58 is located on the second side wall 16 side relative to the holding part 30. The maintenance unit 58 is located on the top wall 17 side relative to the first holding part 31 and the second holding part 32 and on the base frame 20 side relative to the recording head 39. The maintenance unit 58 includes a portion located on the top wall 17 side with respect to the mounting part 57, i.e., a portion that overlaps the mounting part 57 in the height direction Z.

In other words, the maintenance unit 58 overlaps the mounting part 57 in plan view from the height direction Z. The maintenance unit 58 performs a cleaning operation of discharging liquid from the recording head 39 by depressurizing the interior of the recording head 39 by using a cap and/or a discharge pump (not illustrated), for example.

As illustrated in FIGS. 1, 3, and 4, the main body 11 includes an operation unit 59. The operation unit 59 is provided at the top wall 17 of the housing 12. The operation unit 59 is located at a corner portion between a portion where the top wall 17 and the front wall 13 are connected to each other and a portion where the top wall 17 and the second side wall 16 are connected to each other.

The operation unit 59 is composed of a touch panel and the like, for example, and is used by the user to input various information. The operation unit 59 includes a portion located on the top wall 17 side with respect to the mounting part 57, i.e., a portion that overlaps the mounting part 57 in the height direction Z. In other words, the operation unit 59 overlaps the mounting part 57 in plan view from the height direction Z.

As illustrated in FIGS. 1 to 3, the main body 11 includes a frame body 60. The frame body 60 supports various members and units mounted in the main body 11, such as the holding part 30, the recording unit 35, the transport unit 45, the mounting part 57, and the maintenance unit 58 described above, as well as the housing 12.

The frame body 60 includes the base frame 20, the first side frame 61, the second side frame 62, a first coupling frame 63, and a second coupling frame 64. The first side frame 61 and the second side frame 62 are disposed to face each other in the width direction X of the recording device 10.

The base frame 20 extends in the width direction X in the housing 12 to form the bottom wall of the housing 12. The base frame 20 is supported from the installation surface S side with the leg part 70. The first side frame 61 is located on the first side wall 15 side relative to the housing part 21. The first side frame 61 is coupled with the base frame 20 and extends in the height direction Z from the base frame 20.

The first side frame 61 supports the first holding part 31 of the holding part 30 such that the first holding part 31 is rotatable around an axis line extending in the width direction X. The first side frame 61 supports the driving part 33 that drives the holding part 30. The driving part 33 is located on the side opposite to the second side frame 62 with respect to the first side frame 61.

The second side frame 62 is located on the second side wall 16 side relative to the housing part 21. The second side frame 62 is coupled with the base frame 20, and extends in the height direction Z from the base frame 20. The second side frame 62 supports the second holding part 32 of the holding part 30 such that the second holding part 32 is rotatable around an axis line extending in the width direction X.

The first coupling frame 63 is a member coupled with the second side frame 62 between the second side frame 62 and the second side wall 16. The mounting part 57 is supported at the first coupling frame 63. Specifically, the mounting part 57 is located at a position separated from the second side frame 62 on the side opposite to the first side frame 61 with respect to the second side frame 62, and is supported by the second side frame 62 through the first coupling frame 63.

The second coupling frame 64 is a member coupled with the second side frame 62 between the second side frame 62 and the second side wall 16. The second coupling frame 64 is located on the top wall 17 side relative to the first coupling frame 63. The maintenance unit 58 is supported at the second coupling frame 64. Specifically, the maintenance unit 58 is located on the side opposite to the first side frame 61 with respect to the second side frame 62, and is supported by the second side frame 62 through the second coupling frame 64.

Figure 5:
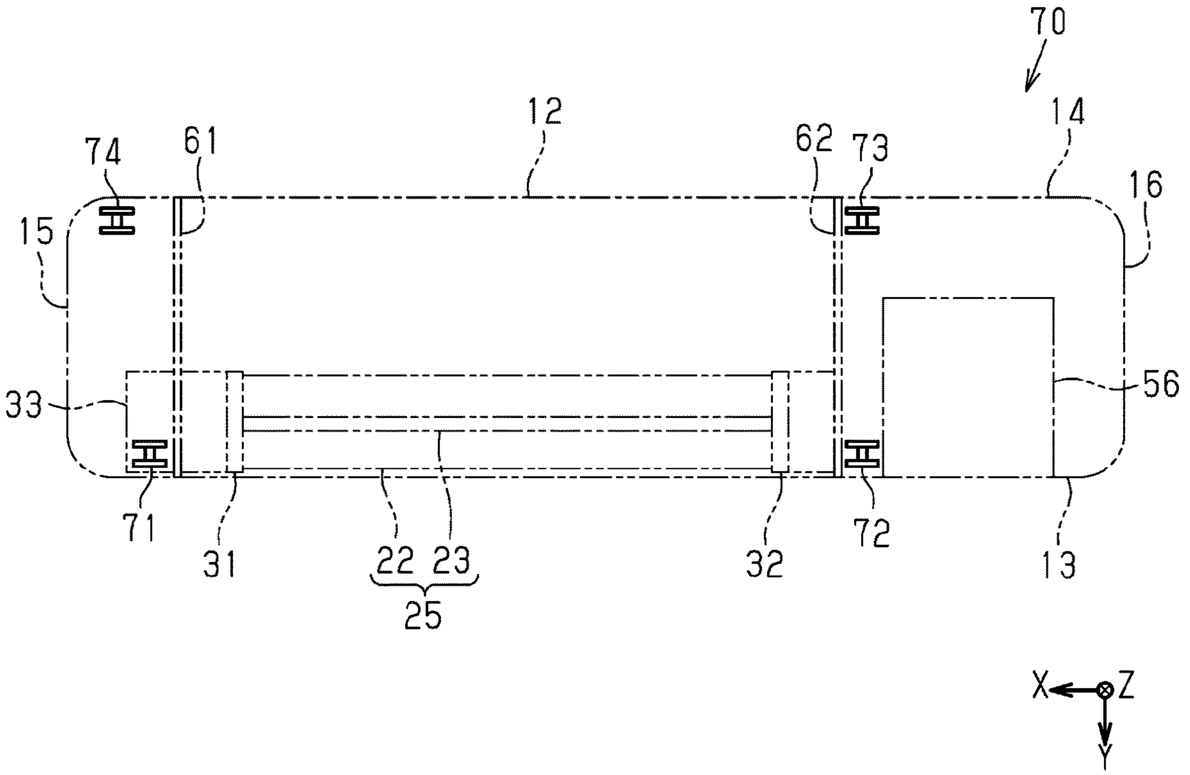
FIG. 5 is a view illustrating an arrangement of each support leg in plan view as viewed from the height direction.

As illustrated in FIGS. 3 and 5, the leg part 70 that supports the base frame 20 from the installation surface S side includes a first caster 71, a second caster 72, a third caster 73, and a fourth caster 74 as support legs including contact parts capable of making contact with the installation surface S. The first caster 71 to the fourth caster 74 are disposed at respective positions different from each other in plan view from the height direction Z.

The first caster 71 to the fourth caster 74 include wheels that turn along with the movement of the recording device 10, and are configured such that the direction of the wheel can be changed by rotating around an axis line extending in the height direction Z. The first caster 71 to the fourth caster 74 include locking mechanisms (not illustrated) capable of hindering the rotation of the wheels. Note that the installation surface S is a surface where the main body 11 (the recording device 10) is installed.

In plan view from the height direction Z, the first caster 71 and the second caster 72 are aligned in the width direction X at positions on the front wall 13 side in the front-rear direction Y. Specifically, the first caster 71 and the second caster 72 are aligned in the width direction X at positions on the front wall 13 side relative to the core member 23 of the roll body 25 housed in the housing part 21. In plan view from the height direction Z, the first caster 71 and the second caster 72 are located at positions where the first holding part 31 and the second holding part 32 are interposed therebetween in the width direction.

In plan view from the height direction Z, the third caster 73 and the fourth caster 74 are aligned in the width direction X at positions on the rear wall 14 side in the front-rear direction Y. The first caster 71 and the fourth caster 74 are substantially aligned with each other in the front-rear direction Y. The second caster 72 and the third caster 73 are substantially aligned with each other in the front-rear direction Y.

The first caster 71 and the fourth caster 74 are located on the side opposite to the second side frame 62 with respect to the first side frame 61. In plan view from the height direction Z, the first caster 71 is located at a position that overlaps the driving part 33 that drives the holding part 30 into rotation. The driving part 33 is located at a position adjacent to the first side frame 61 on the first side wall 15 side.

In plan view in the front-rear direction Y, the fourth caster 74 is located on the first side wall 15 side relative to the first caster 71. In other words, in the width direction X, the distance from the first side frame 61 to the fourth caster 74 is greater than the distance from the first side frame 61 to the first caster 71.

The second caster 72 and the third caster 73 are located on the side opposite to the first side frame 61 with respect to the second side frame 62. In plan view from the height direction Z, the second caster 72 and the third caster 73 are aligned in the front-rear direction Y. In the width direction X, the second caster 72 and the third caster 73 are located between the second side frame 62 and the mounting part 57.

Figure 6:
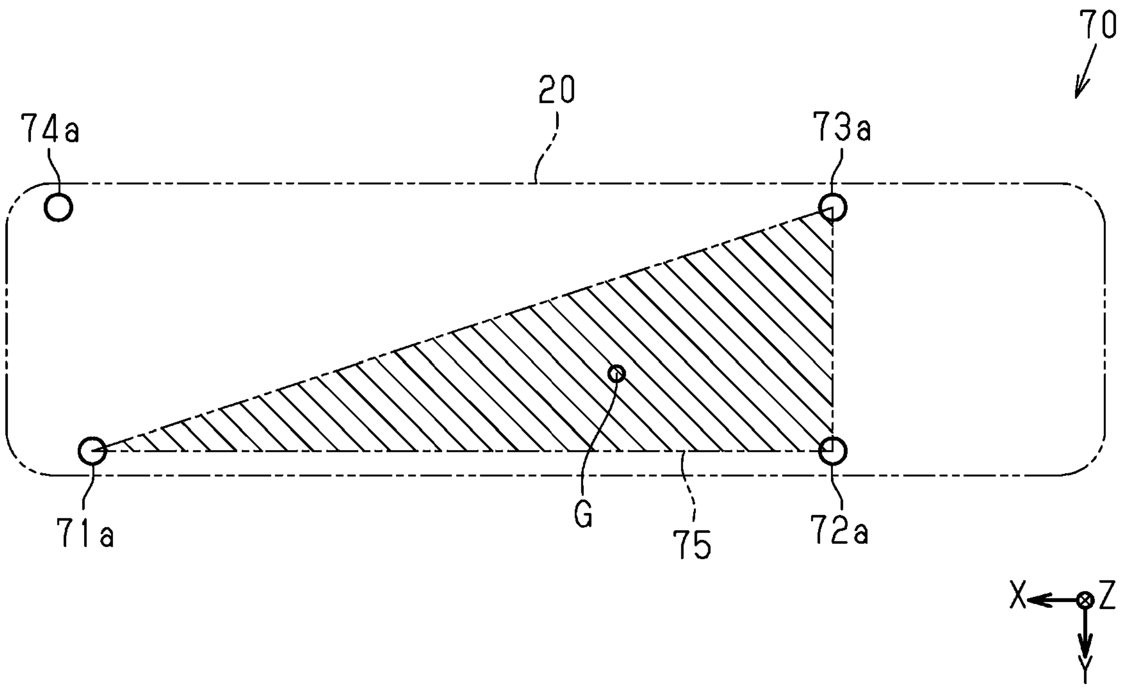
FIG. 6 is a view illustrating a positional relationship between a contact part of each support leg and a center of gravity of the recording device in plan view as viewed from the height direction.

As illustrated in FIGS. 3, 5, and 6, of the first caster 71 to the fourth caster 74, the first caster 71 to the third caster 73 are fixed support legs fixed to the base frame 20. The contact parts of the first caster 71 to the third caster 73 are reference contact parts 71*a*, 72*a* and 73*a*, respectively. The three reference contact parts 71*a*, 72*a* and 73*a* are located on the same plane.

Figure 7:
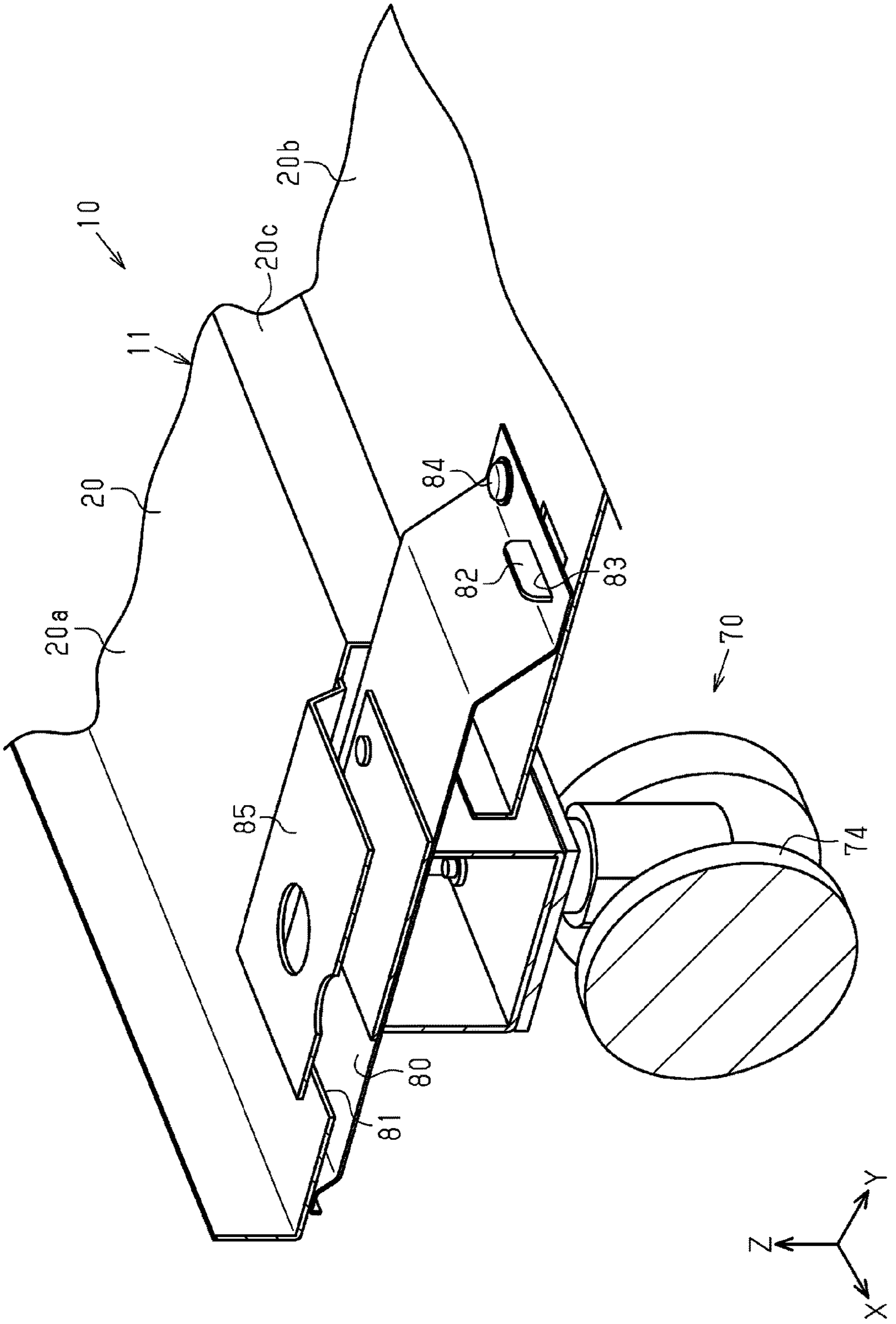
FIG. 7 is a cross-sectional perspective view illustrating a fourth caster and its periphery.

As illustrated in FIGS. 6 and 7, the fourth caster 74 is a movable support leg coupled with the base frame 20 of the main body 11 through an elastic member 80 that is elastically deformable in the height direction Z that is orthogonal to (intersects) the plane on which the three reference contact parts 71*a*, 72*a* and 73*a* are located. In this embodiment, the elastic member 80 is composed of a metal leaf spring having a substantially rectangular shape. The contact part of the fourth caster 74 is one movable contact part 74*a*.

As viewed from the height direction Z orthogonal to the plane on which the three reference contact parts 71*a*, 72*a* and 73*a* are located, the main body 11 (the recording device 10) includes a center of gravity G within a region 75 of a triangular shape with straight lines connecting the three reference contact parts 71*a*, 72*a* and 73*a*.

As illustrated in FIGS. 5 and 7, the base frame 20 includes a first plate part 20*a* located at an end portion on the rear wall 14 side in the front-rear direction Y, a second plate part 20*b* located at a position lower than the first plate part 20*a*, and a coupling plate part 20*c* coupling between the first plate part 20*a* and the second plate part 20*b*. The first plate part 20*a*, the second plate part 20*b*, and the coupling plate part 20*c* are integrally formed in the state where they are aligned in the front-rear direction Y.

The first plate part 20*a* and the second plate part 20*b* are parallel to each other, and the coupling plate part 20*c* is perpendicular to both the first plate part 20*a* and the second plate part 20*b*. That is, the coupling plate part 20*c* forms a step between the first plate part 20*a* and the second plate part 20*b*. A rectangular cutout part 81 is formed at an end portion on the first side wall 15 side in the first plate part 20*a*. The cutout part 81 spans to the coupling plate part 20*c* in the front-rear direction Y.

A base end portion that is one end portion of the elastic member 80 in the longitudinal direction is fixed at a position corresponding to the cutout part 81 in the front-rear direction Y on the second plate part 20*b*. In this embodiment, the longitudinal direction of the elastic member 80 and the front-rear direction Y match each other. The base end portion of the elastic member 80 in the longitudinal direction has a rectangular plate-shape extending along the second plate part 20*b*.

In the base end portion of the elastic member 80 in the longitudinal direction, an insertion hole 83 to which a plate-shaped insertion piece 82 provided upright on the second plate part 20*b* is inserted, and a hole that is opposite, in the height direction Z, to a screw hole (not illustrated) formed in the second plate part 20*b* at a position adjacent to the insertion hole 83 in the width direction X are formed.

In the state where the position is set by inserting the insertion piece 82 to the insertion hole 83, the elastic member 80 is fixed to the above-described screw hole (not illustrated) of the second plate part 20*b* with a screw 84 at the above-described hole (not illustrated). From the base end portion in the longitudinal direction fixed on the second plate part 20*b*, the elastic member 80 extends gradually upward in the front-rear direction Y toward the rear wall 14 side, and then extends straight toward the rear wall 14 along the first plate part 20*a*.

In this case, the elastic member 80 extends beyond the cutout part 81 to the rear wall 14 side relative to the cutout part 81. That is, a tip end portion of the elastic member 80 is located on the rear wall 14 side relative to the cutout part 81 in the front-rear direction Y. The tip end portion of the elastic member 80 in the front-rear direction Y is curved upward so as to be in contact with the bottom surface of the first plate part 20*a*. In this manner, the elastic member 80 is supported by the second plate part 20*b* in a cantilever manner and thus elastically deforms in the height direction Z.

The fourth caster 74 including the one movable contact part 74*a* is coupled to a center portion of the bottom surface of the elastic member 80. A rectangular plate-shaped limiting part 85 that is opposite to the center portion of the elastic member 80 in the height direction Z is disposed above the cutout part 81. A gap of approximately 8 mm, for example, is formed between the elastic member 80 and the limiting part 85.

The limiting part 85 is integrally molded with the first plate part 20*a*, and is located at a position higher than other portions of the first plate part 20*a*. When the elastic member 80 excessively elastically deforms toward the upper side, i.e., the main body 11 side, the elastic member 80 makes contact with the limiting part 85, and thus the limiting part 85 limits the upward elastic deformation of the elastic member 80.

Figure 8:
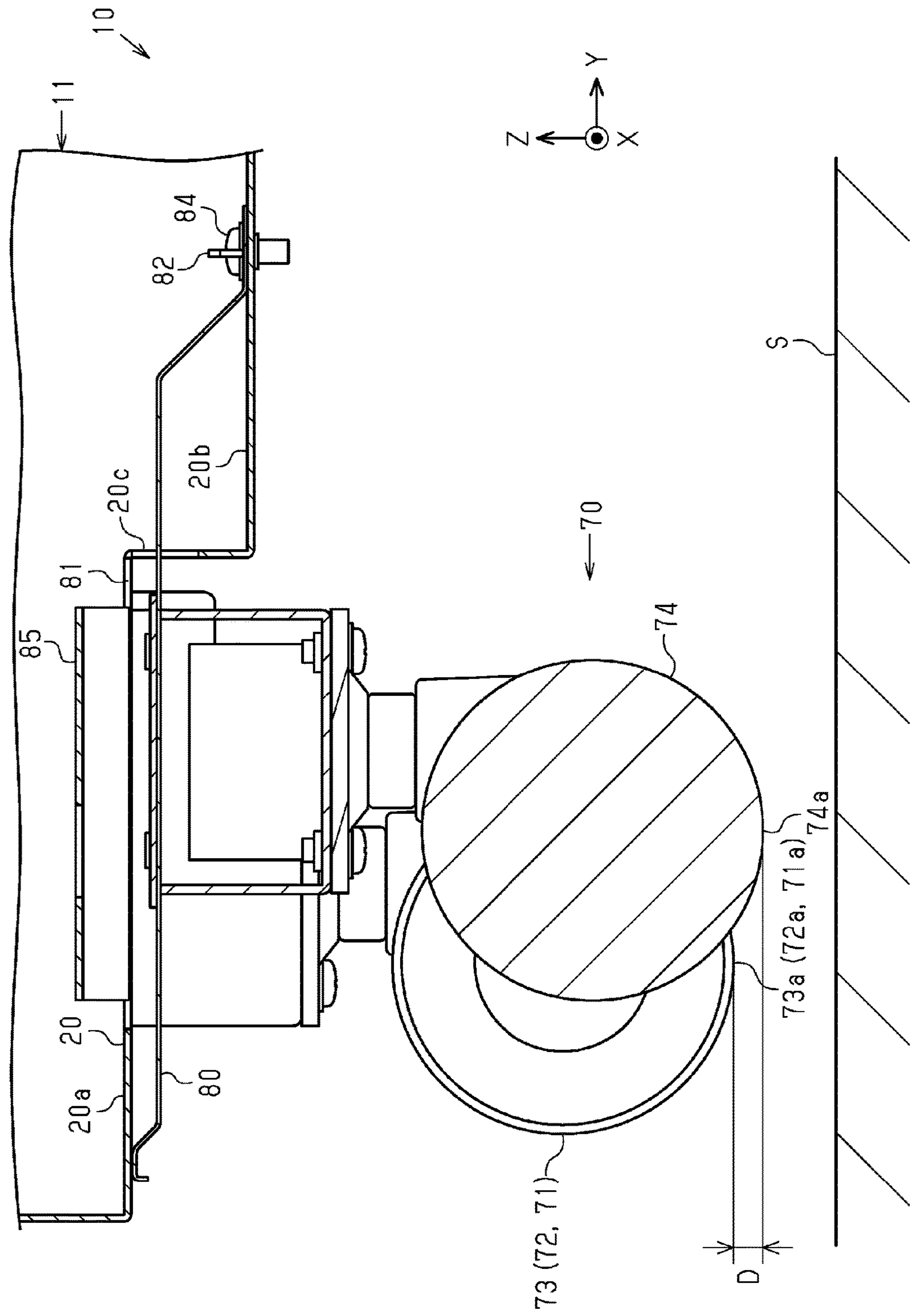
FIG. 8 is an enlarged sectional view of a main part illustrating a state where a leg part of the recording device is away from an installation surface and faces the installation surface.

As illustrated in FIGS. 6 and 8, when the leg part 70 is held in a horizontal posture together with the main body 11 in the state where the leg part 70 is away from the installation surface S and faces the installation surface S in the recording device 10, the fourth caster 74 is disposed at a position closer to the installation surface S relative to the first caster 71 to the third caster 73.

That is, when the leg part 70 is held in a horizontal posture together with the main body 11 in the state where the leg part 70 is away from the installation surface S and faces the installation surface S in the recording device 10, the one movable contact part 74*a* is disposed at a position closer to the installation surface S relative to the three reference contact parts 71*a*, 72*a* and 73*a*. In this case, a difference D between the movable contact part 74*a* and the reference contact parts 71*a*, 72*a* and 73*a* in the height direction Z is set to approximately 4 mm, for example.

Next, an operation when the recording device 10 is installed on the installation surface S is described.

Figure 9:
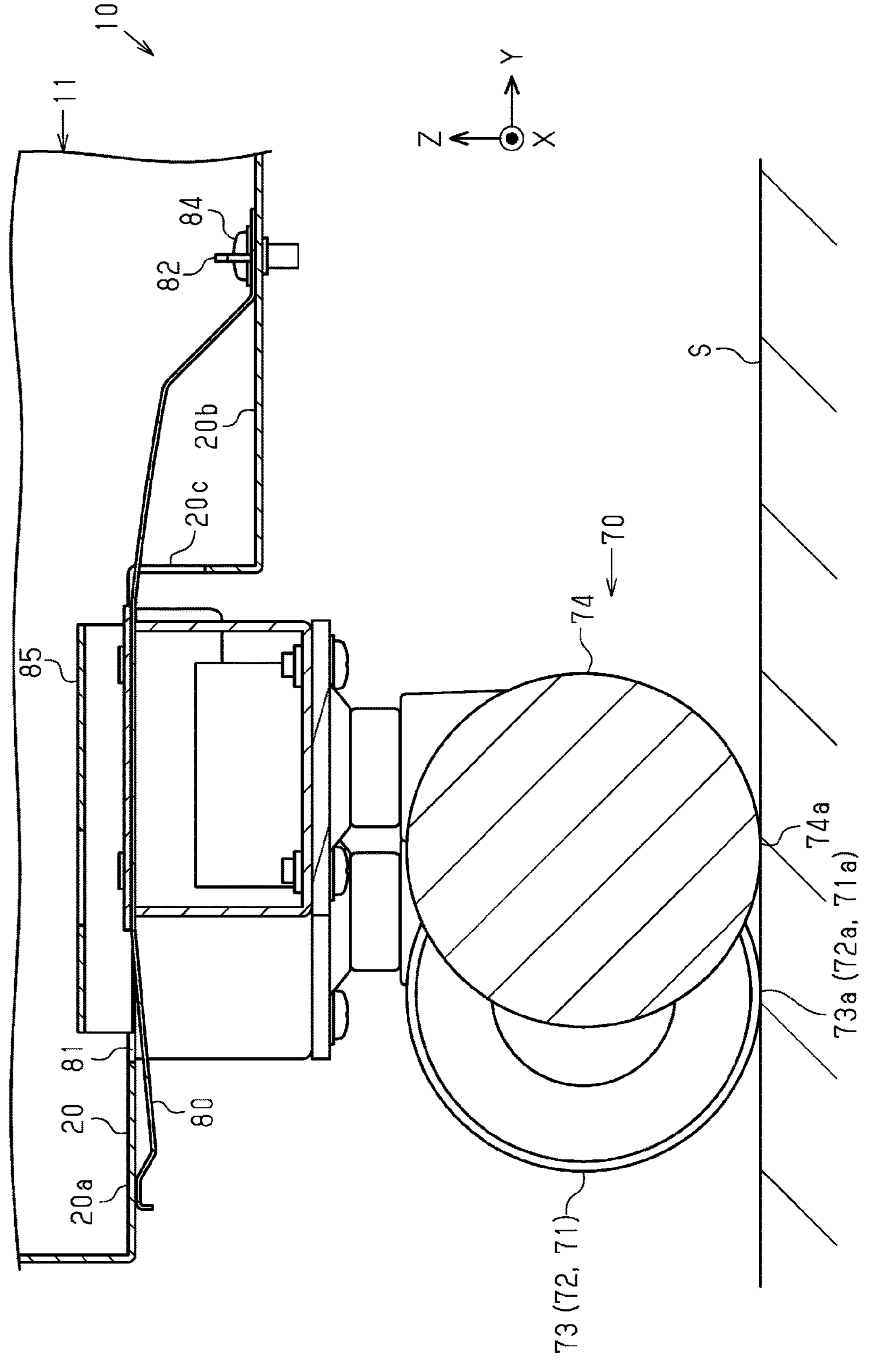
FIG. 9 is an enlarged sectional view of a main part illustrating a state where, in the recording device, first to fourth casters are in contact with the installation surface.

As illustrated in FIG. 9, when the recording device 10 is installed at a portion with no irregularity on the installation surface S, the first caster 71 to the fourth caster 74 make contact with the installation surface S, but the weight of the main body 11 is supported by the first caster 71 to the third caster 73. At this time, the elastic member 80 coupled with the fourth caster 74 elastically deforms while being curved such that the center portion in the front-rear direction Y protrudes upward by the difference D between the movable contact part 74*a* and the reference contact parts 71*a*, 72*a* and 73*a*. In this case, the force that acts on the main body 11 to distort the main body 11 is only the reactive force of the elastically deformed elastic member 80. Since this reactive force is small, this reactive force causes almost no distortion in the main body 11.

Figure 10:
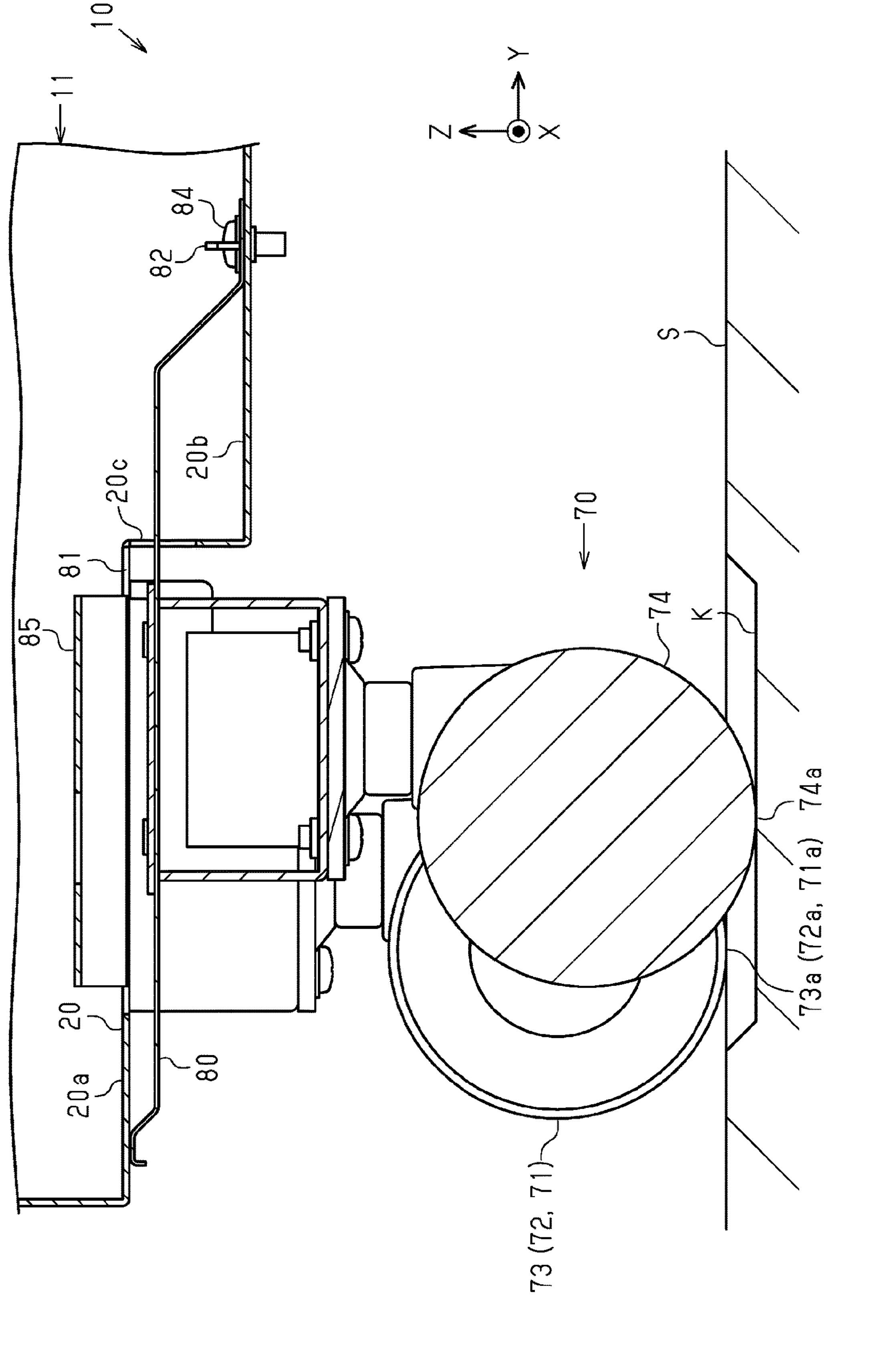
FIG. 10 is an enlarged sectional view of a main part illustrating a state where, in the recording device, the first to third casters are in contact with the installation surface and the fourth caster is in contact with a recessed surface lower than other portions in the installation surface.

As illustrated in FIG. 10, when the recording device 10 is installed at a portion of a recessed surface K recessed in the installation surface S such that the fourth caster 74 makes contact with the recessed surface K, the first caster 71 to the third caster 73 make contact with the installation surface S. At this time, when the difference between the installation surface S and the recessed surface K is equal to the difference D between the movable contact part 74*a* and the reference contact parts 71*a*, 72*a* and 73*a*, the elastic member 80 does not elastically deform, and therefore the main body 11 is not distorted, In addition, when the difference between the installation surface S and the recessed surface K is smaller than the difference D between the movable contact part 74*a* and the reference contact parts 71*a*, 72*a* and 73*a*, the elastic member 80 coupled with the fourth caster 74 is elastically deformed while being curved such that the center portion in the front-rear direction Y protrudes upward by the difference. In this case, the force that acts on the main body 11 to distort the main body 11 is only the reactive force of the elastically deformed elastic member 80. Since this reactive force is further smaller than that of the above-described case of FIG. 9, this reactive force causes almost no distortion in the main body 11.

Figure 11:
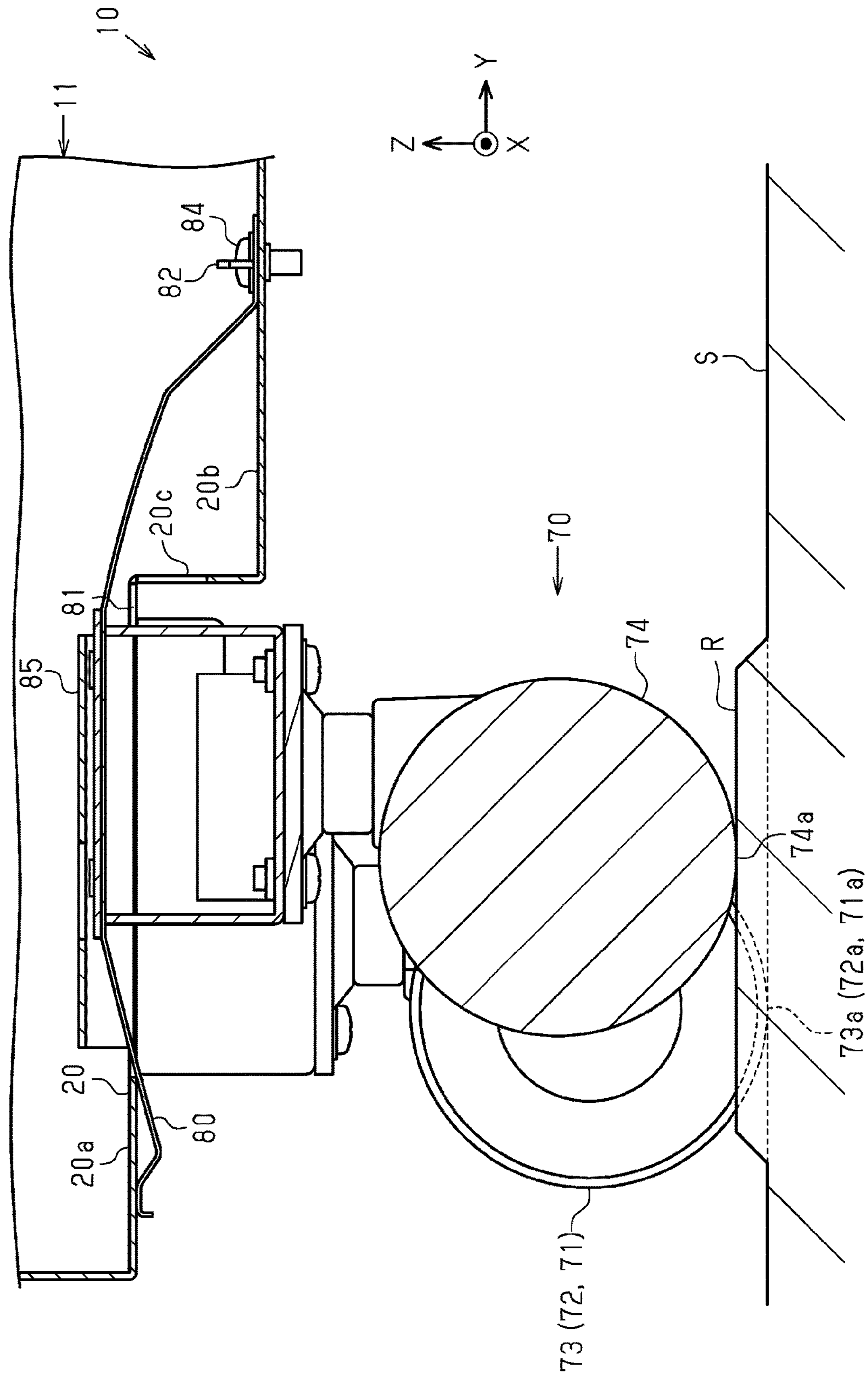
FIG. 11 is an enlarged sectional view of a main part illustrating a state where, in the recording device, the first to third casters are in contact with the installation surface and the fourth caster is in contact with a raised surface higher than other portions in the installation surface.

As illustrated in FIG. 11, when the recording device 10 is installed at a portion of a raised surface R raised in the installation surface S such that the fourth caster 74 makes contact with the raised surface R, the first caster 71 to the third caster 73 make contact with the installation surface S. At this time, the elastic member 80 coupled with the fourth caster 74 elastically deforms while being curved such that the center portion in the front-rear direction Y protrudes upward by an amount obtained by adding the difference between the installation surface S and the raised surface R to the difference D between the movable contact part 74*a* and the reference contact parts 71*a*, 72*a* and 73*a*.

In this case, the force that acts on the main body 11 to distort the main body 11 is only the reactive force of the elastically deformed elastic member 80. This reactive force is greater than that of the above-described case of FIG. 9, but is not large enough to distort the main body 11. Therefore, this reactive force causes almost no distortion in the main body 11.

In the above-described manner, twist of the main body 11 due to irregularities of the installation surface S is suppressed by elastic deformation of the elastic member 80, and thus distortion in the main body 11 due to irregularities of the installation surface S is suppressed.

Note that, even in the case where the installation surface S is tilted with respect to the horizontal plane and/or the case where the installation surface S has multiple irregularities and the plane including the reference contact parts 71*a*, 72*a* and 73*a* is tilted with respect to the horizontal plane, the elastic member 80 elastically deforms when the recording device 10 is installed on the installation surface S, and thus the fourth caster 74 makes contact with the installation surface S in such a manner as to follow the inclination and/or the irregularities of the installation surface S. In this manner, twist of the main body 11 due to the irregularities and/or the inclination of the installation surface S is suppressed by elastic deformation of the elastic member 80, and thus distortion in the main body 11 due to the irregularities and/or the inclination of the installation surface S is suppressed.

The embodiment elaborated above can achieve the following effects.

(1) In the recording device 10, the leg part 70 that supports the main body 11 from the installation surface S includes contact parts capable of making contact with the installation surface S at respective positions different from each other, and the contact parts include the three reference contact parts 71*a*, 72*a* and 73*a* located on the same plane and the one movable contact part 74*a*. The movable contact part 74*a* is coupled with the main body 11 through the elastic member 80 that is elastically deformable in a direction that intersects the above-described plane.

With this configuration, when the three reference contact parts 71*a*, 72*a* and 73*a* are brought into contact with the installation surface S in the case where the installation surface S has irregularities, the movable contact part 74*a* makes contact with the installation surface S in such a manner as to follow the irregularities through elastic deformation of the elastic member 80. In this manner, twist of the main body 11 due to irregularities of the installation surface S is suppressed by elastic deformation of the elastic member 80, and thus distortion in the main body 11 due to irregularities of the installation surface S is suppressed.

(2) In the recording device 10, the main body 11 has the center of gravity G within the region 75 of the triangular shape with straight lines connecting the three reference contact parts 71*a*, 72*a* and 73*a* as viewed in the direction orthogonal to the plane including the three reference contact parts 71*a*, 72*a* and 73*a*. This configuration can stabilize the posture of the recording device 10 when the recording device 10 is supported on the plane on which the reference contact parts 71*a*, 72*a* and 73*a* are located.

(3) In the recording device 10, the elastic member 80 is supported by the main body 11 in a cantilever manner. In this configuration, the end portion of the elastic member 80 on the side opposite to the side supported by the main body 11 in a cantilever manner is a free end, and thus the elastic member 80 is easily elastically deformed by the action of the external force. Thus, the followability of the movable contact part 74*a* to the installation surface S can be increased.

(4) In the recording device 10, the main body 11 includes the limiting part 85 that limits elastic deformation of the elastic member 80 to the main body 11 side. With this configuration, the limiting part 85 limits elastic deformation of the elastic member 80, and thus plastic deformation of the elastic member 80 can be suppressed even when an excessive external force acts on the elastic member 80.

(5) In the recording device 10, the movable contact part 74*a* is coupled with a center portion of the elastic member 80 having a substantially rectangular plate shape. Typically, when the elastic member 80 is elastically deformed in a configuration in which the movable contact part 74*a* is composed of a caster and the caster is coupled with an end portion of the elastic member 80, the orientation of the rotation axis at the time of direction change of the caster is largely tilted with respect to the installation surface S, thus making it difficult to achieve the direction change of the caster. In view of this, with the above-described configuration, even when the elastic member 80 is elastically deformed, the situation where the orientation of the rotation axis at the time of direction change of the caster is tilted with respect to the installation surface S can be suppressed, and thus the direction change of the caster can be readily performed.

(6) In the recording device 10, when the leg part 70 is held in a horizontal posture together with the main body 11 in the state where the leg part 70 is away from the installation surface S and faces the installation surface S, the one movable contact part 74*a* is disposed at a position closer to the installation surface S relative to the three reference contact parts 71*a*, 72*a* and 73*a*. With this configuration, the frequency of the contact of the movable contact part 74*a* with the installation surface S when the recording device 10 is installed on the installation surface S can be increased. In this manner, the frequency of the situation where the recording device 10 is supported at four or more points including the one movable contact part 74*a* and the three reference contact parts 71*a*, 72*a* and 73*a* is increased, and thus rattle of the recording device 10 is suppressed even when a load is exerted on the recording device 10 by the user.

MODIFICATION EXAMPLES

The embodiment may be modified as follows. In addition, the embodiment and the following modification may be combined insofar as no technical inconsistency is caused.

Figure 12:
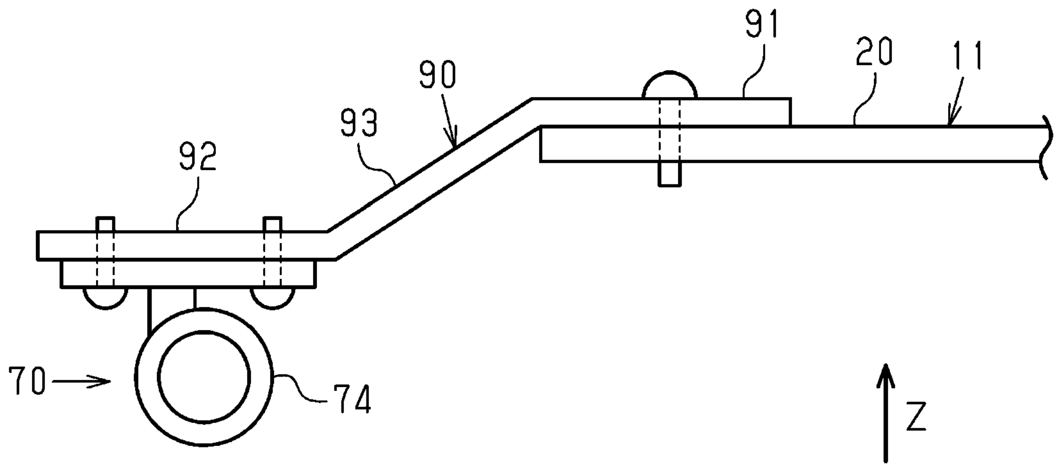
FIG. 12 is a schematic side view illustrating a state where the fourth caster is coupled with the main body through an elastic member of a modification.

As illustrated in FIG. 12, the elastic member 80 may be replaced by an elastic member 90. The elastic member 90 is composed of a metal leaf spring having a substantially rectangular shape, and includes a horizontal first end portion 91, a horizontal second end portion 92, and a coupling part 93 that couples the first end portion 91 with the second end portion 92 such that the first end portion 91 is higher. In the elastic member 90, the first end portion 91 is overlaid on and screw fixed to the base frame 20 of the main body 11, and the fourth caster 74 is fixed to the bottom surface of the second end portion 92 by screwing.

Figure 13:
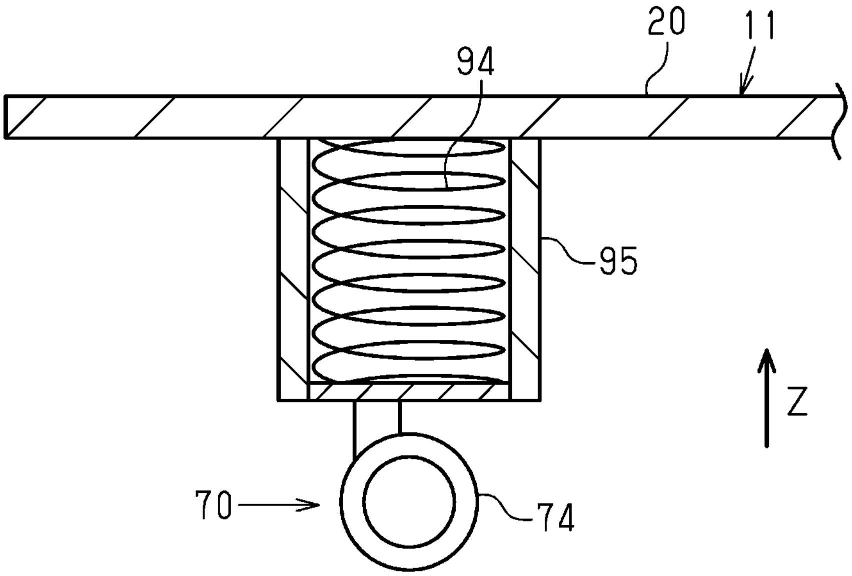
FIG. 13 is a schematic cross-sectional side view illustrating a state where the fourth caster is coupled with the main body through an elastic member of another modification.

As illustrated in FIG. 13, the elastic member 80 may be replaced by an elastic member 94 composed of a coil spring. In this case, one end of the elastic member 94 is fixed to the bottom surface of the base frame 20 of the main body 11 and the other end is fixed to the fourth caster 74 such that the extension and contraction direction is the height direction Z. Further, in this case, on the bottom surface of the base frame 20, a cylindrical guide member 95 that guides the elastic member 94 to extend and contract in the height direction Z is provided to surround the elastic member 94.

When the leg part 70 is held in a horizontal posture together with the main body 11 in the state where the leg part 70 is away from the installation surface S and faces the installation surface S, the one movable contact part 74*a* may not be disposed at a position closer to the installation surface S relative to the three reference contact parts 71*a*, 72*a* and 73*a*.

The movable contact part 74*a* may not be coupled with the center portion of the elastic member 80. For example, the movable contact part 74*a* may be coupled with an end portion of the elastic member 80.

The limiting part 85 may be omitted.

The elastic member 80 may not be supported by the main body 11 in a cantilever manner. Specifically, for example, both end portions of the elastic member 80 may be supported by the main body 11.

The main body 11 may not have the center of gravity G within the region 75 of the triangular shape with straight lines connecting the three reference contact parts 71*a*, 72*a* and 73*a* as viewed in the direction orthogonal to the plane including the three reference contact parts 71*a*, 72*a* and 73*a*.

The elastic member 80 may be composed of rubber or synthetic resin.

The support leg including the contact part may not be composed of a caster. For example, the support leg including the contact part may not turn.

The recording device 10 may be a recording device that jets and discharges liquid other than ink. Examples of the state of the liquid discharged from the recording device as a very small amount of droplet include a granular form, a teardrop form, and a long-tailed thread form. Here, it suffices that the above-described liquid is a material that can be jetted from the recording device. For example, it suffices that the liquid is a material in a liquid phase, and examples of the liquid include fluids such as liquid materials having a high or low viscosity, sol, gel water, and other inorganic solvents, organic solvents, solutions, liquid resins, liquid metals, and metal melts. Examples of the liquid include not only liquid as a state of a material, but also liquid in which particles of functional materials composed of solids such as pigments and metal particles are dissolved, dispersed or mixed in solvent. Typical examples of the liquid include the ink described in the embodiment and a liquid crystal. Here, the ink encompasses various liquid compositions such as common water-based inks, oil-based inks, gel inks, and hotmelt inks. Specific examples of the recording device include devices that jets liquid in which materials such as electrode materials and color materials used for manufacturing liquid crystal displays, electroluminescence displays, surface-emitted displays, color filters and the like are dispersed or dissolved. The recording device may be a device that jets biological organic materials used for manufacturing biochips, a device used as a precision pipette that jets liquid serving as samples, a textile printing device, a micro dispenser, or the like. The recording device may be a device that exactly jets lubricating oil to precision machines such as clocks and cameras, and a device that jets transparent resin liquid of ultraviolet curable resin and the like onto a board to form minute hemisphere lenses, optical lenses, and the like used for optical communication elements and the like. The recording device may be a device that jets acid etching liquid, alkaline etching liquid and the like for etching a board and the like.

The recording device 10 may be a recording device of types other than the ink-jet type. Specifically, the recording device 10 may be an electrophotographic recording device including, as the recording unit 35, a photoconductor drum, a light exposure unit, and a transfer unit.

Contents derived from the embodiment and the modification are described below.

A recording device includes a main body including a recording unit configured to perform recording on a medium pulled out from a roll body including the medium wound around a core member, and a leg part configured to support the main body from an installation surface on which the main body is installed. The leg part includes contact parts configured to make contact with the installation surface at respective positions different from each other, the contact parts include three reference contact parts located on a same plane and one movable contact part, and the movable contact part is coupled with the main body through an elastic member that is elastically deformable in a direction that intersects the plane.

With this configuration, when the three reference contact parts make contact with the installation surface in the case where the installation surface has irregularities, the movable contact part makes contact with the installation surface in such a manner as to follow the irregularities through elastic deformation of the elastic member. In this manner, twist of the main body due to the irregularities of the installation surface is suppressed by elastic deformation of the elastic member, and thus distortion in the main body due to the irregularities of the installation surface is suppressed.

In the recording device, as viewed from a direction orthogonal to the plane, the main body may have a center of gravity within a region of a triangular shape with straight lines connecting the three reference contact parts.

This configuration stabilizes the posture of the recording device when the recording device is supported on the plane on which the three reference contact parts are located.

In the recording device, the elastic member may be supported by the main body in a cantilever manner.

In this configuration, the end portion of the elastic member on the side opposite to the side supported by the main body in a cantilever manner is a free end, and thus the elastic member is easily elastically deformed by the action of the external force. Thus, the followability of the movable contact part to the installation surface can be increased.

In the recording device, the main body may include a limiting part configured to limit elastic deformation of the elastic member to a main body side.

In this configuration, the limiting part limits elastic deformation of the elastic member, and thus plastic deformation of the elastic member can be suppressed even when an excessive external force acts on the elastic member.

In the recording device, the movable contact part may be coupled with a center portion of the elastic member.

Typically, when the elastic member is elastically deformed in a configuration in which the movable contact part is composed of a caster and the caster is coupled with an end portion of the elastic member, the orientation of the rotation axis at the time of direction change of the caster is largely tilted with respect to the installation surface, thus making it difficult to achieve the direction change of the caster. In view of this, with the above-described configuration, a situation where the orientation of the rotation axis at the time of direction change of the caster is tilted to the installation surface is suppressed even when the elastic member is elastically deformed, and thus the direction change of the caster can be readily performed.

In the recording device, when the leg part is held in a horizontal posture together with the main body in a state where the leg part is away from the installation surface and faces the installation surface, the one movable contact part may be disposed at a position closer to the installation surface relative to the three reference contact parts.

This configuration can increase the frequency of the contact of the movable contact part with the installation surface when the recording device is installed on the installation surface. In this manner, the frequency of the situation where the recording device is supported at four or more points including the one movable contact part and the three reference contact parts is increased, and thus rattle of the recording device is suppressed even when a load is exerted on the recording device by the user.

What is claimed is:

1. A recording device comprising:

a main body including a housing having a cuboid shape, a base frame is coupled with the housing, and a recording unit configured to discharge liquid on a medium pulled out from a roll body including the medium wound around a core member, and a leg part configured to support the main body from an installation surface at which the main body is installed, wherein the leg part includes contact parts configured to make contact with the installation surface at positions different from each other, the contact parts include three reference contact parts located in a same plane and one movable contact part, the movable contact part is coupled with the base frame through an elastic member that is elastically deformable in a direction that intersects the plane, the three reference contact parts are fixed to the base frame, and the movable contact part is movable in the direction that intersects the plane, and when the leg part is held in a horizontal posture together with the main body in a state where the leg part is away from the installation surface and faces the installation surface, the one movable contact part is disposed at a position closer to the installation surface than the three reference contact parts.

2. The recording device according to claim 1, wherein the main body has a center of gravity within a region of a triangular shape formed by connecting the three reference contact parts with straight lines as viewed from a direction orthogonal to the plane.

3. The recording device according to claim 1, wherein the elastic member is supported by the base frame in a cantilever manner.

4. The recording device according to claim 3, wherein the main body includes a limiting part configured to limit elastic deformation of the elastic member to the main body side.

5. The recording device according to claim 1, wherein the movable contact part is coupled with a center portion of the elastic member.

6. The recording device according to claim 1, wherein two reference contact parts of the reference contact parts are disposed in the recording device on a front wall side on which the roll body is disposed, and one reference contact part of the reference contact parts and the movable contact part are disposed on a rear wall side in the recording device.

7. The recording device according to claim 6, wherein a distance between the reference contact part and the movable contact part disposed on the rear wall side is greater than a distance between the two reference contact parts disposed on the front wall side.

8. The recording device according to claim 1, wherein the main body includes a first side wall, a second side wall, the three reference contact parts include a first reference contact part, a second reference contact part and a third reference contact part, the first reference contact part is disposed at a position closer to the first side wall relative to the second reference contact part and the third reference contact part, the second reference contact part and the third reference contact part are disposed at a position closer to the second side wall relative to the first reference contact part, and a distance from the second side wall to the movable contact part is smaller than the distance from the second side wall to the second reference contact part and the third reference contact part.

9. The recording device according to claim 1, wherein the elastic member is fixed to the base frame, and the movable contact part is fixed to a bottom surface of the elastic member.

10. A recording device comprising:

a main body including a housing having a cuboid shape, a base frame is coupled with the housing, and a recording unit configured to discharge liquid on a medium pulled out from a roll body including the medium wound around a core member, and a leg part configured to support the main body from an installation surface at which the main body is installed, wherein the leg part includes contact parts configured to make contact with the installation surface at positions different from each other, the contact parts include three reference contact parts located in a same plane and one movable contact part, the movable contact part is coupled with the base frame through an elastic member that is elastically deformable in a direction that intersects the plane, the three reference contact parts are fixed to the base frame, and the movable contact part is movable in the direction that intersects the plane, the elastic member is supported by the base frame in a cantilever manner, and the main body includes a limiting part configured to limit elastic deformation of the elastic member to the main body side.

* * * * *